(No Model.)

T. R. ALMOND.
REAMER.

No. 351,482. Patented Oct. 26, 1886.

WITNESSES:
A. Schelil.
Gustav Schneppe.

INVENTOR
Thos. R. Almond
BY Briesen & Steele
ATTORNEYS.

UNITED STATES PATENT OFFICE.

THOMAS R. ALMOND, OF NEW YORK, N. Y.

REAMER.

SPECIFICATION forming part of Letters Patent No. 351,482, dated October 26, 1886.

Application filed August 6, 1886. Serial No. 210,173. (No model.)

*To all whom it may concern:*

Be it known that I, THOMAS R. ALMOND, a resident of New York city, in the county and State of New York, have invented an Improved Reamer, of which the following is a full, clear, and exact description, reference being made to the accompanying drawings, in which—

Figure 1:
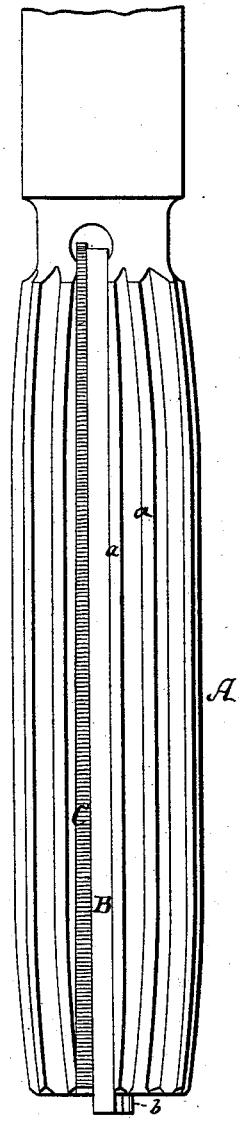
Figure 2:
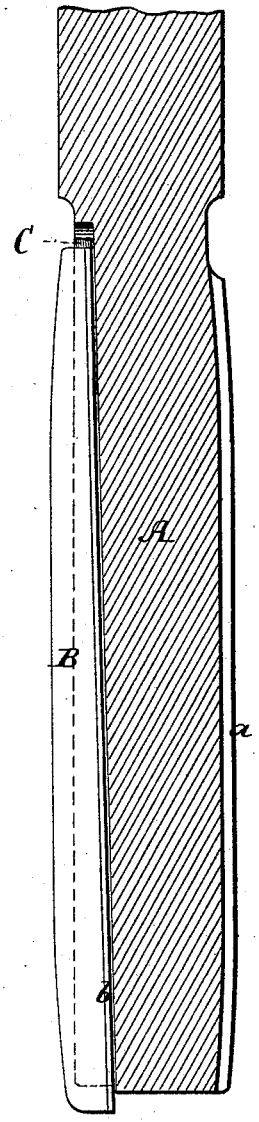
Figure 3:
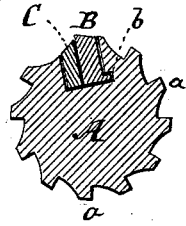
Figure 4:
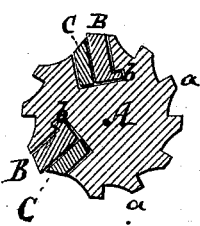

Figure 1 is a side view of my improved reamer. Fig. 2 is a longitudinal central section of the same. Fig. 3 is a cross-section of the same. Fig. 4 is a cross-section of a modification of the same.

The object of this invention is to produce a reamer which shall be adjustable for the reaming of holes of slightly varying diameters. Reamers with fixed cutting-blades, which are of common construction, are liable to wear smaller, and after having been used a certain length of time will no longer produce the exact diameters of holes within which they are used. Yet absolute exactness is necessary for the production of perfect work.

Reamers with merely adjustable blades have been proposed before my invention, for the purpose of meeting this difficulty; but they in turn are objectionable, because they do not utilize the body of the reamer in cutting, and therefore lack solidity and steadiness in the operation, and also because it is a matter of extreme difficulty to properly adjust all of a series of movable blades to the infinitesimal extent to which adjustment must ordinarily be carried.

My invention consists, in substance, in providing an ordinary fluted reamer having series of fixed blades with one or more adjustable blades, each adjustable blade being substantially opposite a fixed blade. By this means I retain all the valuable features of a solid reamer, and add thereto an extremely sensitive means of adjustment or enlargement.

In the drawings, the letter A represents the reamer, which, except the arrangement of the movable blades, hereinafter described, is of the ordinary construction—that is to say, provided with a series of fixed blades or ribs, *a*, which, by preference, are of slightly smaller diameter at each end of the reamer than at the middle. Into the face of this reamer A is set, as appears from Figs. 1 and 3, one adjustable blade, B, which has the length of the reamer, and which is narrower at one end than toward the other end, as appears clearly from Fig. 2 of the drawings, in which figure the blade B appears in side view. This blade B has on one side a projecting rib, *b*, which enters a corresponding groove in the body of the reamer; or the rib may be on the body of the reamer and the groove in the blade, for the purpose of holding the blade in place and guiding it while it is undergoing adjustment.

A wedge, C, may be crowded against the face of the adjustable blade B, as is clearly shown in Figs. 1 and 3, for the purpose of assisting in holding the same in place. Instead of said wedge, a screw or analogous clamping device may be used for assisting in holding the blade B in place.

The adjustable blade B can be so set or held on the reamer A as to project from the center thereof exactly as far as do the fixed blades *a*. In this condition the reamer would act with its stationary blades and the adjustable blade conjointly, the same as any ordinary reamer having only stationary blades; but the moment these blades wear to an extent sufficient to require a very slight enlargement of the reamer for producing a hole for the size of which the reamer had been originally intended, the blade B is adjusted outward, so that its cutting-edge will project slightly farther from the center of the reamer than do the fixed blades *a*, and from this time on the adjustable blade, together with those fixed blades of the reamer which are diametrically opposite to it, will begin their special functions for the purposes of this invention—that is to say, the adjustable blade, together with the fixed blades which are opposite to it, will perform the work of reaming, and will produce a hole of a diameter which equals the distance between the cutting-edges of the adjustable blade B and the fixed blades which are opposite to it. Thus, by adjusting the blade B, the operating center of the instrument will be slightly shifted—that is to say, while the blade B is equidistant from the axis of the reamer with the fixed blades *a*, the operating-center will be the axis of the reamer A; but as soon as the blade B is adjusted outwardly the operating-center will be shifted half the distance of the said adjustment from the true axis of the reamer A in the direction of the blade B. Whenever the blade B is used in this manner the other stationary blades $a$ of the reamer, excepting those which are opposite to the blade B, will act mainly as guides and not as cutters.

When I speak of the stationary blades $a$ which are diametrically opposite to the movable blade B, I do not mean that the same shall be exactly opposite, but substantially and sufficiently so to be able to coact in the manner described with the blade B.

One adjustable blade B will suffice for all ordinary cases; but, if desired, two or more may be placed in a reamer, as appears from Fig. 4 of the drawings, care, however, being taken that no two adjustable blades shall be diametrically opposite one another, but, on the contrary, that every adjustable blade B shall be substantially opposite fixed blades $a$.

The adjustable blade B being set in a ribbed or fluted reamer, A, the instrument is not liable to be interfered with in its action by dust or cuttings, as the same will enter the grooves of the reamer and not get in between the ribs and the surfaces of the metal acted upon.

I claim—

1. The fluted reamer A, having stationary blades $a$, and adjustable blade B, said adjustable blade being substantially opposite certain of the stationary blades, as specified.

2. The reamer A, having stationary blades $a$, combined with the movable blade B, having guide-rib $b$, substantially as herein shown and described.

3. The reamer A, having stationary blades $a$, combined with the movable blade B, having guide-rib, and clamping device C, substantially as herein shown and described.

T. R. ALMOND.

Witnesses:
CHARLES G. M. THOMAS,
JAMES TURK.